UNITED STATES PATENT OFFICE.

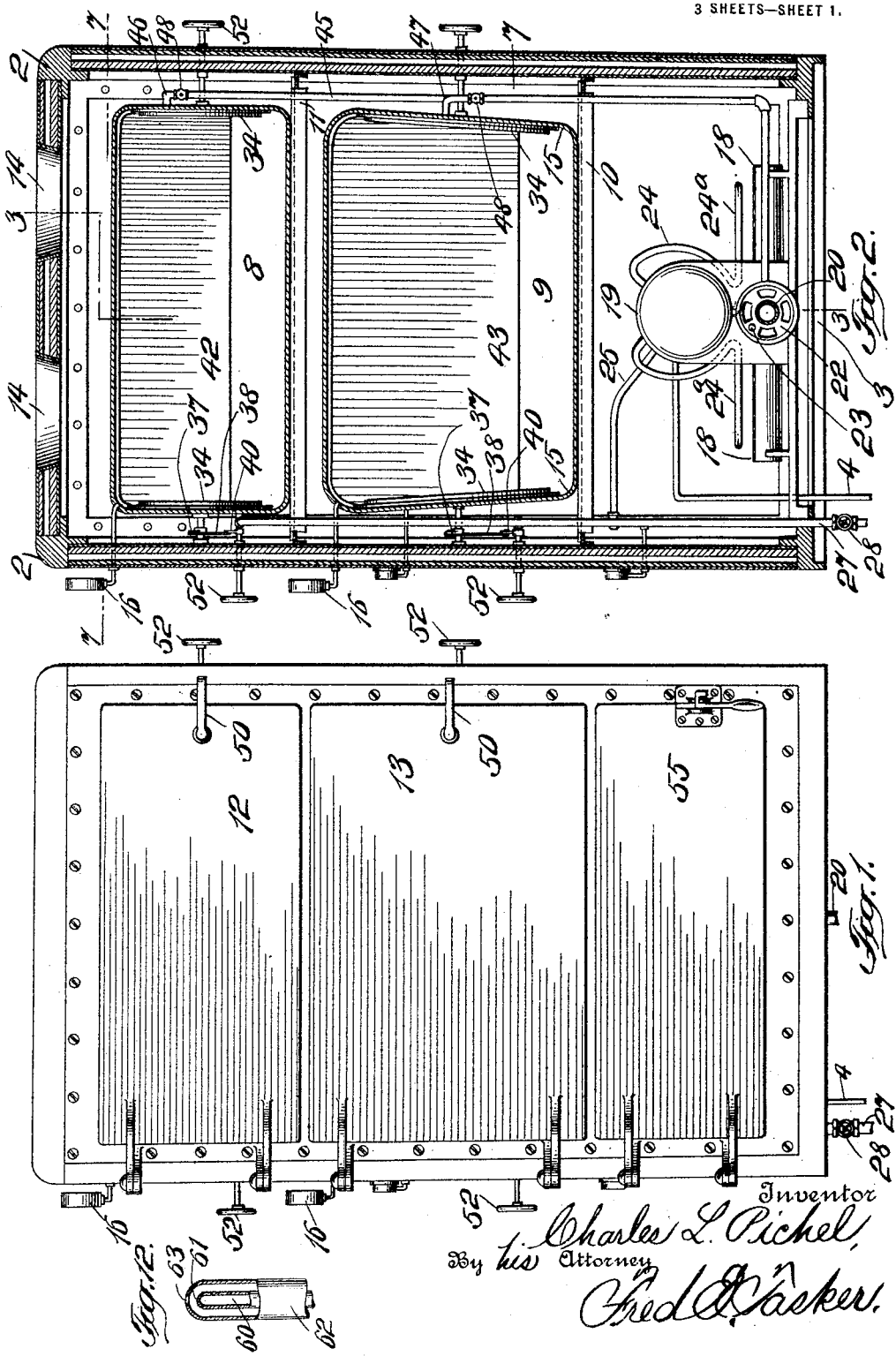

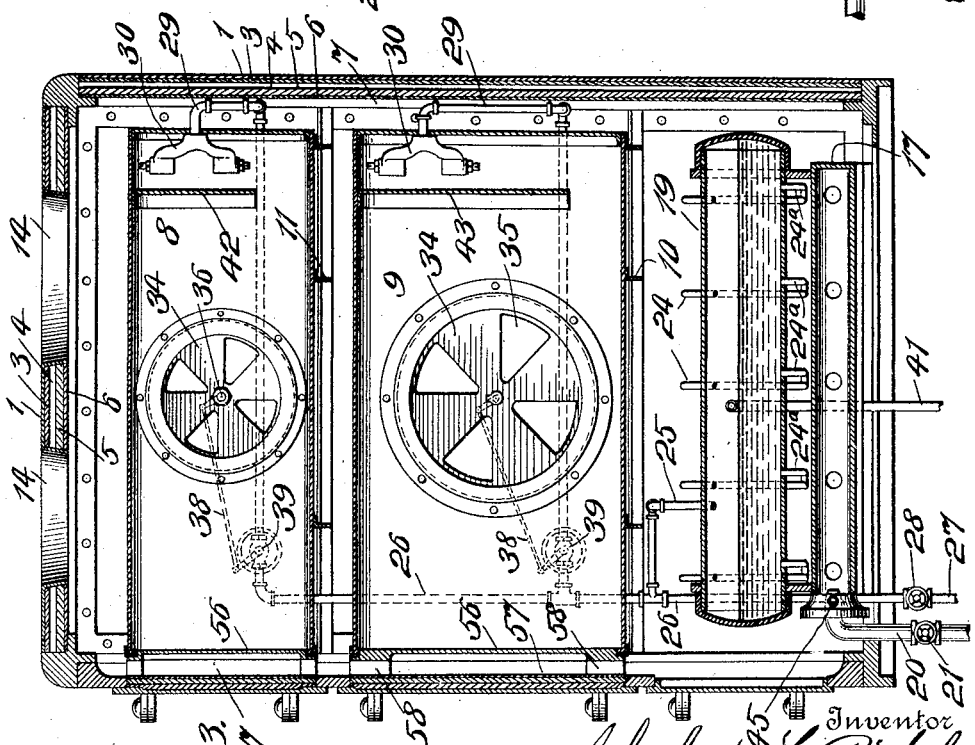

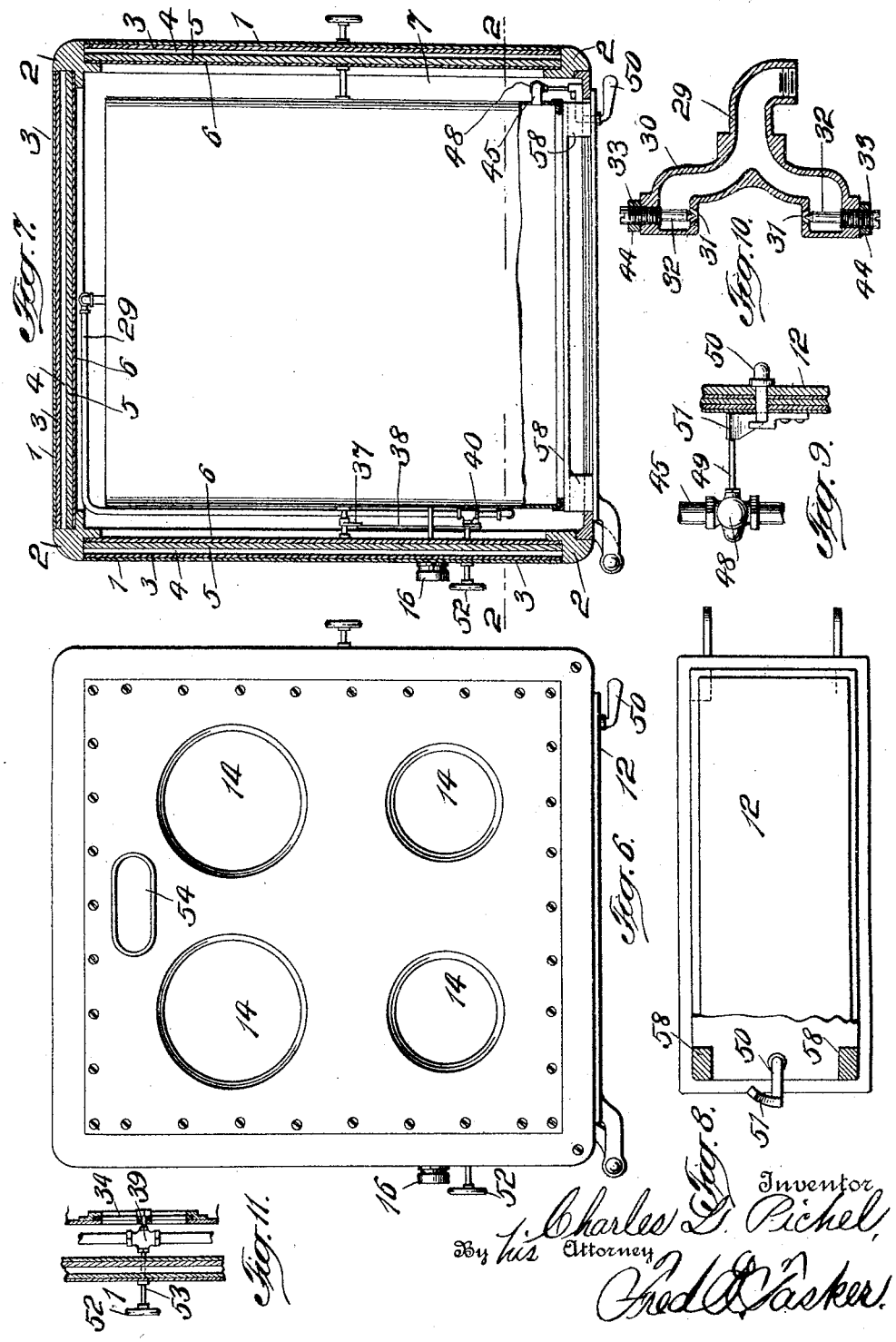

CHARLES L. PICHEL, OF NEW YORK, N. Y.

AERATED STOVE.

1,404,640. Specification of Letters Patent. Patented Jan. 24, 1922.

Application filed January 15, 1917. Serial No. 142,424.

*To all whom it may concern:*

Be it known that I, CHARLES L. PICHEL, a citizen of the United States, and resident of New York, in the county of New York and State of New York, have invented certain new and useful Improvements in Aerated Stoves, of which the following is a specification, reference being had therein to the accompanying drawing.

This invention refers to stoves, or similar cooking or heating apparatus which is absolutely clean and sanitary, and produces no dirt, stains, dust, smoke, or odors. Among its many objects is that of the utilization of a high temperature (according to the particular food being cooked varying from say 212° F. to 500° F. or over) of dry heat combined with aerated and superheated steam and with a constant circulation of air so that there may be a perfect blending of air, dry heat, and moisture; that is to say, a highly rarefied air, a highly superheated moisture, and a high temperature, whereby the food is cooked quickly, economically, and advantageously from a great number of points of view, as will be hereinafter more fully explained. The invention, therefore, consists essentially in the construction, arrangement, and combination of parts, substantially as will be hereinafter described and then more particularly pointed out in the claims.

In the accompanying drawings illustrating my invention:

Figure 1 is a front elevation of my improved stove with all the front doors closed;

Figure 2 is a vertical section of my improved stove viewed from the front taken on the line 2—2 of Figure 7;

Figure 3 is a vertical section on the line 3—3 of Figure 2, looking toward the left of Figure 2 in the direction of the arrow.

Figure 4 is a detail plan view of a form of gas burner which I have preferably used in connection with my stove;

Figure 5 is a detail view illustrating an example of a combined heat inlet damper and steam cut-off valve;

Figure 6 is a top plan view of my improved stove; and

Figure 7 is a like view in horizontal cross section taken on the line 7—7 of Figure 2.

Figure 8 is an inside elevation of the door of one of the ovens;

Figure 9 is a detail sectional view of a release valve for the steam and odors in the ovens, said valve being operated by the handle of the door;

Figure 10 is a sectional view of the steam inlet within the ovens;

Figure 11 is a detail sectional view of a modified form of means for jointly operating one of the air dampers and one of the steam cut-off devices.

Figure 12 is a detail sectional view of a modified form of gas and steam burner.

Similar characters of reference designate corresponding parts throughout the different figures of the drawing.

It will be noted that the fuel employed to heat the stove may be gas, coal, or any other substance, liquid, fluid, or solid. I assume, however, that a very convenient, effective and simple form of the stove will be one which employs a gas burner, and to this end I have indicated generally in the drawings one form of gas burner which is practical, simple, and economical, and which I shall hereinafter fully describe in detail; and also I show a modified form of burner in Figure 12.

1 designates an outside sheet metal shell of the stove, which may have any desired thickness and which will be arranged in some proper and suitable shape for a cooking stove device. The stove is ordinarily of a general upright design, as indicated particularly in Figures 1 and 2, the whole exterior of the stove being made up of this sheet metal shell 1 provided and supplied in sheets of proper size and securely held together by the corner rabbetted castings 2 which have any preferred shape, length, and size. The main wall of the stove, therefore, consists primarily of the outer sheet metal 1 supported by the aforesaid castings 2, and immediately within shell 1 is a wall or solid asbestos or like heat insulating material 3 preferably about one-fourth of an inch thick. Immediately within the asbestos wall 3 is a dead air space 4 which is about one-fourth of an inch thick, and immediately on the other side of the dead air space 4 is an envelope of steatite 5, about one-half an inch thick, close to which is an inner envelope 6 of thin sheet metal which immediately surrounds the fire space 7. It will thus be understood that the wall of the stove consists of the heat-retaining steatite envelope, the dead air space, and the asbestos heat-resisting insulation which prevents the heat from escaping through the outside of the shell 1.

And this particular arrangement and structure of the walls of my improved oven casing of my invention, is of great advantage, especially in times of hot weather, in that when the device is once thoroughly heated, and the burner is shut off, while the outer asbestos wall 3 will give up its heat very quickly, by conduction to the outer air through the outer metallic wall 1, and be cooled in a very few moments, the inner wall 4, by reason of its peculiar high qualities of heat retention, will be appreciably warm, and even sometimes quite hot, several hours after the burner has been shut off. In fact applicant has known a block of steatite of about an inch in thickness, highly heated, and exposed to the air of a closed room otherwise unheated, to be appreciably warm to the hand after about ten hours.

And it will be seen that by use of my improved form of wall, my improved stove herein shown, described and claimed, may be used in practice as what is commonly known as a "fireless-cooker," when once raised to a high temperature, merely by shutting off the burner, and steam, and closing the air-dampers of the oven or ovens. But I do not intend to limit myself to an inner wall of steatite for the purpose set forth, as any other suitable substance or material having equally high heat retaining qualities may be used in place thereof, without departing from the scope of my invention.

Within the main shell I employ a series of ovens, preferably two or more, to provide distinct compartments in which the cooking is to be performed, and in the form of the invention shown in the drawings two ovens are delineated, the upper one being indicated by 8, and the lower one by 9, the same being of any suitable size and shape and supported by the transverse angle bars 10 below oven 9, and 11 below oven 8, which are held at their ends on suitable ledges or cleats on the main outer wall of the stove, said ovens 8 and 9 being separated from the main wall by the aforesaid flame space 7, which is of greater or less size and which permits the flame arising from the combustion of the gas in the burner in the bottom of the stove to ascend into contact with the ovens for the purpose of effectually heating the same. Oven 8 is provided with a door 12 and oven 9 with a door 13 that have the usual hinges, knobs, fasteners, and other appurtenances and which are built with the insulating and heat-resisting and other sections the same as or similar to the main wall of the stove. The doors 12 and 13 shown in Figure 3, carry an inner plate 56 attached thereto by webs or blocks 58, and between said plate 56 and the front portion of the door is a space 57 which forms a part of the flame space of the stove. In the fire or flame space 7 which receives the heating flame from the burner, as I have already described, there is a circulation of the flame to and around the body of the ovens as well as between them so as to effectually heat said ovens.

I have spoken of the thin sheet metal envelope 6 immediately surrounding the flame space, the adjoining steatite envelope 5, the next dead air space 4, the next asbestos wall 3, and the outer sheet metal shell 1 of the stove, and their various relations to each other, their relative thicknesses, etc., but it will be understood that these several components of the outer wall construction which are found not only in the main shell, but in the constitution of the swinging doors for the ovens as well, may each be made of a single integral entity or may be made up of separate members between which there is a space filled with the several materials, and, therefore, it is possible to diversify the precise structure of the main wall and these several features within a wide range of equivalent constructions, and, I, therefore, reserve the liberty of making all such changes as experience may advise to be best.

At the top of the stove, as shown in Figures 3 and 6, are suitable stove holes 14 that pass through the main wall, made up as it is of the several constituent members, as I have described, and communicate with the flame space 7 so that the heat passing upwardly through the space 7 may emerge through these openings 14 and act upon cooking utensils or other articles placed over said openings. Said openings may have covers, spiders, supports or other usual contrivances, not shown, for closing them and for holding the utensils in place, and it will be observed that they are preferably made in a conical manner so as to allow utensils whose bottoms are of varying diameter to be supported therein. Further, it should be noted that the lower oven 9, and in fact both ovens, if so desired, is made with the sides sloping or vertically inclined at 15 so that the flame space 7 may be wider at certain points than at others, giving the flame a better surface of attack on these sides of the oven 9. This construction may apply not only to the sides but to the front and back of the lower oven or to both ovens. Each oven is preferably provided with a pyrometer or other heat-indicating device 16, the dial of which is outside the stove so that it can be readily inspected from without, while the connection is made by means of a tube with the interior of each oven and enables the temperature within the oven to be readily conveyed to the dial and apprehended therefrom by the observer or attendant using the stove.

Below the ovens, that is to say, in the lower portion of the main shell and behind lower door 55, is the burner to which I have already alluded and the preferable form of which I have delineated by showing it in plan view clearly in Figure 4 and in section in Figures 2 and 3. It consists essentially of a longitudinal cylinder or chamber 17 having lateral branch or burner pipes 18 preferably alternating with each other at opposite sides of the main mixing chamber 17, said branch or burner pipes 18 being each provided on its upper side with rows of perforations through which the mixed gas emerges and at which it is ignited. One end of the tube 17 is entered by the gas supply pipe 20 having a valve 21, there being arranged in this end of the tube 17 a damper 22 having handle 23, which damper allows the admission of air to the interior of the tube 17 to be mixed with the gas therein. The burner thus constructed is able to supply a flame extending over a considerable area inasmuch as the multiplicity of the fine perforations permit ignition at a large number of points, and this flame is utilized for a double purpose; first, that of filling the flame space of the stove and heating the ovens to a high temperature; and second, it is directed against the boiler or water chamber for the purpose of generating steam to be supplied to the ovens so that moist heat can be added to the hot air within said ovens and cooking permitted at very high temperatures.

Immediately above the burner 17 and its branches 18 is located a boiler or water chamber 19 consisting preferably of an elongated cylindrical receptacle of proper size and shape. This is provided with an inlet pipe 41 for supplying a certain quantity of water, which pipe runs from any source of supply; also it will be noted that pipes 24 emerge from the top or upper portion of the boiler 19 and curve downwardly alongside the same until they reach a point contiguous to the burner branches 18, where these pipes 24 are bent into the horizontal sections 24ª which lie directly above the finely perforated branches 18 in two parallel portions, one bent back upon the other with the end of said bent pipe 24ª entering the bottom of the boiler 19. Therefore, it will be clearly perceived that the water in the boiler 19 will fill the pipes 24ª and 24, and that steam will be generated in these pipes and will be conveyed into the upper portion of the boiler 19 through the ends of the pipes 24 thereby filling the upper interior part of the boiler 19 from which the steam will pass off through a branch pipe 25 which connects with a pipe 26 running upwardly through some suitable course in the flame space 7 and around to a point in the rear of the ovens 8 and 9 where said pipe 26 connects with branch pipes 29 that lead to the delivery pipes 30 that are located in the ovens 8 and 9 in chambers formed by partitions or baffle plates in said ovens, that in the oven 8 being denoted by the numeral 42 and that in the oven 9 being denoted by the numeral 43. The partition 42 extends from the top of the oven 8 towards the bottom but it does not touch the latter, a space being left between the lower end of the partition and the bottom of the oven, through which air and steam can pass. The same arrangement is true of the partition 43 in the oven 9.

The pipe 26 which carries steam to the oven is preferably provided with a lower section 27 which runs outside of the stove and away from it to any desired point to provide means for releasing the steam pressure when desired, said pipe being provided with a relief valve 28 (see Figure 3), which may or may not be automatic. This pipe may run to a tank or boiler for the purpose of heating the water therein, as for example a kitchen boiler. The special construction of the delivery end 30 of the steam supply pipes 29, which I have said are connected with the main steam transmitting pipe 26, varies within wide limits, but I show one efficient form in Figure 3, the details of which are brought out more clearly in Figure 10, and here the delivery end 30 of the pipe consists of a head provided with outlet openings 31 which serve as nozzles for jets of steam, said openings 31 being provided with valves 32 having conical ends that operate in conjunction with the conical seats in the openings 31, said valves 32 having screw-threaded sections 33 which screw through bearings in the heads 30, being operated by a screw driver or other tool in making the necessary adjustment from time to time so as to vary this size of the issuing steam jets, and preferably it will be found convenient to employ lock nuts 44 with these valves 32 so as to hold them tightly in any position to which they may be adjusted. Through the nozzles 31 therefore, two opposing steam jets issue and strike forcibly and actively against each other so as to break up the steam into an infinite number of minute particles and thus fill the chambers in the rear ends of the oven with a large volume of steam under strong pressure which will be directed downwardly by the baffle plates 42 and 43 and allowed to pass beneath the lower edges of said baffle plates into the main interior of each of the ovens 8 and 9 where a commingling of the moisture with the intensely hot air in said ovens will take place and I will have provided moist air at a very high temperature, probably of several hundred degrees, by means of which cooking of various articles can be performed effectively and successfully in a very short period of time. It will be understood that I can vary the details of the steam supply nozzles within wide limits provided only the main features of the same are preserved so as to attain the desired result of furnishing the steam to the ovens in the right amount at the right time.

It is not only necessary to supply moisture by means of steam for mingling with the hot air to produce the best results in cooking, but it is also essential to provide an exhaust device by means of which the highly heated contents of the ovens may be allowed to pass out at times into the outer atmosphere and thus a free circulation can be kept up. Or, instead of exhausting into the outer atmosphere I find it often preferably to lead the contents of the ovens into the gas burner chamber 17. 45 denotes an exhaust pipe (see Figure 2) which connects by elbow 46 with the oven 8 at a point in front of the baffle partition 42, and which pipe 45 connects also by an elbow 47 with the oven 9 at a point in front of the partition 43 so that the combined hot air and steam within said chambers can pass out into the combustion chamber or manifold 17, or to the open air, as may be preferred, the pipe 45 being provided with a valve 48, (usually of the well-known needle-valve form) so that the relief and the consequent pressure in each oven may be adjusted to a nicety, by proper manipulation of the valve-stem 49, through the cam-extension 51, on the door-lock-handle 50. When the oven door is closed, the valve 48 is usually slightly open, and the same is provided with adjusting means (not shown, of any required character well known in the valve art) for purposes of regulation, to vary the pressure in the oven, or to transmit the waste gases to the burner, or to the air, or to shut off the relief valve entirely.

It is evident that when an oven is under pressure, if the door should be opened, a blast of heated air and steam will be delivered to the face and person of the operator, liable to cause severe burns; and to prevent this, the door-lock-handle and valve-cam mechanism, are so constructed, co-ordinated and arranged, that the initial movement of such door-lock handle to unlock the door, opens the valve 48 widely, before even the slightest opening of the door, so as to permit of the escape of the hot-air and steam, so as to lower the pressure in the oven to atmospheric pressure before the same is even slightly opened; whereby such dangerous burning blasts are absolutely prevented; such relief of pressure being by way of the pipes 45, 46, and valve 48, etc.

It is necessary at times to permit the introduction of a large quantity of dry and very hot air from the flame space 7 directly into the oven. This is accomplished by means of the dampers 34 in the inclined sides 15 of the oven 9 and also in the sides of the oven 8, said dampers 34 consisting of slotted plates hung on central pivots 36 and working in conjunction with openings 35 in the wall of the oven like an ordinary circular draft damper so that a greater or less amount of heat can be admitted through the same, the communication being directly with the flame space 7 as clearly shown. The admission of this air overcomes and dominates the highly heated aerated and superheated steam and serves to brown the articles that are being cooked in the oven. In order, however, that this supplemental quantity of highly heated dry air can enter the oven at the same time that the latter is filled with steam pressure, it is necessary to simultaneously cut down this pressure with the admission of the hot air and I do this by providing the steam supply pipe 26 with valves 39, one of which is for each oven, as shown in Figures 3 and 5, and arranging means for jointly operating the valve 39 and the damper 34 belonging to a particular oven, said means consisting for example of the devices shown in Figure 5 where the damper pivot 36 has thereon a crank arm 37, while the valve 39 has thereon a crank arm 40, the said crank arms 37 and 40 being connected by a link 38, in such manner that as the valve 39 is moved toward open the damper 34 will be moved toward closed, or vice versa; whereby when either damper or valve is wholly and completely closed, the other will be wholly and completely open; and that when the valve and damper actuating mechanism is in the central and medial position, both damper 34 and valve 39 will each be in the half open position. Either the pivot 36 or the valve pin 39 is provided with a hand wheel 52 outside of the stove and carried by the projecting end of the pivot or pin so that by the rotation of this hand wheel the air inlet valve and the steam cut-off valve are jointly manipulated by the connections as described. A simpler form of means for jointly operating these two valves than that illustrated in Figure 5 will be seen in Figure 11 where the pin 53 which forms the pivot for the damper 34 serves also as the pin for carrying the valve 39 and projects through the wall of the stove and has on the end thereof an operating wheel or handle 52, the same as in the other arrangement, but this form will be found to be very much simpler, as one straight pin or rod carries both the air valve and the steam valve, and the two are actuated in unison, thus dispensing with various mechanical parts.

In addition to the various features already described and claimed, there may be other adjuncts of the stove similar to those often employed with gas and cook stoves, such for example, as the warming oven on top of the stove in which the plates can be warmed and food can be kept, and such oven can be easily heated by running up a flue from the flame space 7 or connecting up a steam pipe. In Figure 6 I have shown an opening at 54 which is an outlet for the flame in the flame space and which may have a valve therein or a pipe connected thereto or may be simply open to serve as a vent to help the draft and allow the exit of some of the heated air. It will be obvious that although I have explained an example of the invention in which there are two ovens, it will be just as easy to make the stove with one oven, and in fact one oven will commonly be the form used, but there may be any number of ovens or compartments and their shape and location may vary within wide limits.

It is well known that a steam burn is a deep burn while a dry heat burn is a surface burn. Dry heat globules break when they strike anything. Steam heat globules penetrate deeply breaking as they go. The high temperature of superheated steam would cook any food quickly, and a high temperature of the dry heat would cook almost anything instantly, except for burning it, but the combination of the unsatisfactory high dry heat with the superheated steam gives a high combination which blankets under pressure all food so that none of the juices, nutriments, or flavors can escape while they are being cooked in the solids; furthermore, this aerated temperature purifies the food while being cooked, and renders it solid and delicious in its own juices and flavors which do not escape. All bacilli are killed by the intense heat.

The steam is brought into the oven and by great force is discharged from two opposing steam jets in the face of each other behind the buffer or baffle plate in the rear of each oven, the same being superheated in the oven. After the steam is broken up by the destructive collision of the two jets at the nozzles 31, said superheated steam will pour out of the mixing chambers behind the baffle plates into the oven to combine with and temper the character of the dry heat therein and make it capable of cooking without burning. The pressure of this aerated steam on food is many times greater than the pressure of the juices and the odors in the food in their efforts to escape. Consequently the juices and odors are held in the solids until cooked therein. About seventy-nine per cent of ordinary fresh meat lies in the juices and flavors, nearly half of which are lost in ordinary cooking, while my stove saves all that is thus lost. By this process the heat for cooking is regular and the surplus heat is stored in the retaining wall, for when the cooking is finished and the fire extinguished a fresh supply of food can be put into the ovens and the stored heat in the wall of the stove will cook the same.

I claim:

1. In a stove, the combination with an oven of a boiler; a pipe leading from the boiler to the oven, such pipe being provided within the oven with oppositely disposed nebulizing steam-nozzles through which jets of steam having their axes coincident strike each other; means for heating the boiler and oven jointly; an exhaust passage to allow escape of the steam, etc., from the oven; and means for throttling the exhaust passage so as to vary the pressure in the oven.

2. In a stove, the combination with a plurality of ovens of a boiler; a pipe leading from the boiler to each of the ovens, such pipes being provided within each oven with oppositely disposed nebulizing steam-nozzles through which jets of steam having their axes coincident strike each other; means for heating the boiler and ovens jointly; exhaust passages to allow escape of the steam, etc., from each oven; and means for throttling the exhaust passages of each oven so as to individually vary the pressure in each oven.

3. In a stove, the combination with an oven of a boiler; a pipe leading from the boiler to the oven, admitting steam thereto; means for regulating the steam pressure; means for heating the boiler and oven jointly; an exhaust passage to allow escape of the steam, etc., from the oven; means for throttling the exhaust passage so as to vary the pressure in the oven; a variable hot air damper for admitting hot air to the oven; and mechanism connecting such hot air damper and regulating steam pressure means, in such manner that as one is thrown toward open the other will be thrown toward closed.

4. In a stove, the combination with an oven of a boiler; a pipe leading from the boiler to the oven, admitting steam thereto; such pipe being provided within the oven with oppositely disposed nebulizing steam-nozzles through which jets of steam having their axes coincident strike each other; a regulating-valve in the steam pipe feeding the nebulizing nozzles; means for heating the boiler and oven jointly; an exhaust passage to allow escape of the steam, etc., from the oven; means for throttling the exhaust passage so as to vary the pressure in the oven; a variable hot-air-damper for admitting hot-air to the oven; and mechanism connecting such hot-air-damper and regulating steam pressure valve, in such manner that as one is thrown toward open, the other will be thrown toward closed.

5. In a stove, the combination with a plurality of ovens of a boiler; a pipe leading from the boiler to each oven, admitting steam thereto; means for heating the boiler and ovens jointly; an exhaust passage to allow escape of steam, etc. from each oven;

means for throttling the exhaust passage so as to vary the pressure in each oven; a variable hot-air-damper for admitting hot-air to each oven; and mechanism connecting such hot-air-damper and regulating steam pressure means, in such manner that as one is thrown toward open the other will be thrown toward closed.

6. In a stove, the combination with a plurality of ovens of a boiler; a pipe leading from the boiler to each oven, admitting steam thereto; such pipe being provided within each oven with oppositely disposed nebulizing steam-nozzles through which jets of steam having their axes coincident strike each other; a regulating-valve in the steam pipe feeding the nebulizing nozzles; means for heating the boiler and ovens jointly; an exhaust passage to allow escape of the steam, etc. from each oven; means for throttling the exhaust passage so as to vary the pressure in each oven; a variable hot-air-damper for admitting hot-air to each oven; and mechanism connecting such hot-air-damper and regulating steam pressure valve, in such manner that as one is thrown toward open, the other will be thrown toward closed.

7. In a stove, the combination with an oven of a boiler; a pipe leading from the boiler to the oven; such pipe being provided within the oven with oppositely disposed nebulizing steam-nozzles through which jets of steam having their axes coincident strike each other; a nebulizing and mixing chamber enclosing the nebulizing nozzle in combination with the main body cooking chamber portion of the oven at the bottom; means for heating the boiler and oven jointly; an exhaust passage to allow escape of the steam, etc. from the oven; and means for throttling the exhaust passage so as to vary the pressure in the oven.

8. In a stove, the combination with a plurality of ovens of a boiler; a pipe leading from the boiler to each of the ovens; such pipe being provided within each oven with oppositely disposed nebulizing steam-nozzles through which jets of steam having their axes coincident strike each other; a nebulizing and mixing-chamber enclosing the nebulizing-nozzle in communication with the main body cooking chamber portion of the ovens at the bottom; means for heating the boiler and ovens jointly; exhaust passages to allow escape of the steam, etc. from each oven; and means for throttling the exhaust passages of each oven so as to individually vary the pressure in each oven.

9. In a stove, the combination with an oven of a boiler; a pipe leading from the boiler to the oven; such pipe being provided within the oven with oppositely disposed nebulizing-steam-nozzles, through which jets of steam having their axes coincident strike each other; a nebulizing and mixing-chamber enclosing the nebulizing-nozzles in communication with the main body cooking chamber portion of the oven at the bottom; means for heating the boiler and oven jointly; an exhaust-passage to allow escape of the steam, etc. from the oven; means for throttling the exhaust passage so as to vary the pressure in the oven; a regulating-valve in the steam pipe feeding the nebulizing-nozzles; and mechanism connecting such regulating-valve and the exhaust throttling means in such manner that as one is thrown toward open, the other will be thrown toward closed.

10. In a stove, the combination with a plurality of ovens of a boiler; a pipe leading from the boiler to each of the ovens; such pipe being provided within each oven with oppositely disposed nebulizing steam-nozzles through which jets of steam having their axes coincident strike each other; a nebulizing and mixing-chamber enclosing the nebulizing-nozzles in combination with the main body cooking chamber portion of the ovens at the bottom; means for heating the boiler and ovens jointly; exhaust passages to allow the escape of the steam, etc. from each oven; means for throttling the exhaust passages of each oven so as to individually vary the pressure in each oven; a regulating-valve in the steam-pipe feeding the nebulizing-nozzles; and mechanism connecting such regulating-valve and the exhaust throttling-means in such manner that as one is thrown toward open, the other will be thrown toward closed.

11. In a stove, the combination with an oven of a boiler; a pipe leading from the boiler to the oven, admitting steam thereto; a steam pressure regulating valve in such pipe; means for heating the boiler and oven jointly; an exhaust passage to allow escape of the steam, etc., from the oven; means for throttling the exhaust passage so as to vary the pressure in the oven; a variable hot-air-damper for admitting hot-air to the oven; mechanism connecting such hot-air-damper and regulating steam pressure valve in such manner that as one is thrown toward open the other will be thrown toward closed; and a housing enclosing the boiler and oven comprising air-spaced double insulating and heat-retaining walls, the inner of steatite, and the outer of asbestos, the air space being between the two; and an inner and an outer metallic-face-plate superposed thereon.

12. In a stove, the combination with an oven of a boiler; a pipe leading from the boiler to the oven, admitting steam thereto; such pipe being provided within the oven with oppositely disposed nebulizing steam-nozzles through which jets of steam having their axes coincident strike each other; a regulating-valve in the steam-pipe feeding the nebulizing nozzles; means for heating the boiler and oven jointly; an exhaust passage to allow escape of the steam, etc., from the oven; means for throttling the exhaust passage so as to vary the pressure in the oven; a variable hot-air-damper for admitting hot-air to the oven; mechanism connecting such hot-air-damper and regulating steam-pressure valve in such manner that as one is thrown toward open the other will be thrown toward closed; a housing enclosing the boiler and oven, comprising air-spaced double insulating and heat-retaining walls, the inner of steatite and the outer of asbestos, the air space being between the two; and an inner and an outer metallic-face-plate superposed thereon.

13. In a stove, the combination with a plurality of ovens of a boiler; a pipe leading from the boiler to each oven admitting steam thereto; a regulating steam pressure valve in such pipe; means for heating the boiler and ovens jointly; an exhaust passage to allow escape of steam, etc., from each oven; means for throttling the exhaust passage so as to vary the pressure in each oven; a variable hot-air-damper for admitting hot-air to each oven; mechanism connecting such hot-air-damper and regulating steam-pressure valve in such manner that as one is thrown toward open the other will be thrown toward closed; a housing enclosing the boiler and oven, comprising air-spaced double insulating and heat-retaining walls, the inner of steatite and the outer of asbestos, the air space being between the two; and an inner and an outer metallic-face-plate superposed thereon.

14. In a stove, the combination with a plurality of ovens of a boiler; a pipe leading from the boiler to each oven admitting steam thereto; such pipe being provided within each oven with oppositely disposed nebulizing steam-nozzles through which jets of steam having their axes coincident strike each other; a regulating-valve in the steam pipe feeding the nebulizing-nozzles; means for heating the boiler and ovens jointly; an exhaust passage to allow escape of steam, etc., from each oven; means for throttling the exhaust passage so as to vary the pressure in each oven; a variable hot-air-damper for admitting hot-air to each oven; mechanism connecting such hot-air-damper and regulating steam pressure valve in such manner that as one is thrown toward open the other will be thrown toward closed; a housing enclosing the boiler and ovens, comprising air-spaced double insulating and heat-retaining walls, the inner of steatite and the outer of asbestos, the air-space being between the two; and an inner and an outer metallic-face-plate superposed thereon.

15. In a stove, the combination with an oven of a boiler; means for conveying steam from the boiler to the oven; a damper for admitting hot-air directly to the oven; a valve for controlling the steam supply; a heat-retaining and insulating casing or housing enclosing the boiler and oven; and means for jointly operating the steam-valve and air-damper so that they are reversely moved to open or closed.

16. In a stove, the combination of a main-shell or housing having therein a flame-space reaching throughout the interior of the same; an oven located in said flame-space so as to be exposed to the attack of the flame; a boiler below the oven; a heating-device below the boiler whereby the boiler and oven are simultaneously heated; a pipe leading from the boiler to the oven for carrying steam thereto and delivering it nebulized; baffle means within the oven contiguous to the steam delivery; and independent means for admitting hot-air from the flame-space directly into the oven.

17. In a stove, the combination of a main-shell or housing having a flame-space throughout the entire interior of the same; an oven supported in said space so as to be surrounded by the flame; heating means below said oven; a boiler; a pipe running to the oven from the boiler and having a pair of oppositely-disposed steam nozzles within the oven from which steam-jets issue and strike each other; a baffle-plate within the oven alongside of said jets; valve means in the steam-pipe for controlling the passage of steam to the oven; and independent means for admitting hot-air to, and permitting exhaustion of hot-air and steam from the oven.

18. In a stove, the combination with an oven of a surrounding main-shell or housing affording a flame-space in which the oven is supported; a heat-retaining wall around the flame-space; a heat-resisting wall around the heat retaining-wall; a combustion chamber below the oven having therein a heating means; a boiler above said heating means, and below the oven so that the boiler and oven may be simultaneously heated; means for conveying steam from the boiler to the oven; a valve for admitting hot-air from the flame space directly to the oven; a valve controlling the supply of steam; and means for jointly operating the steam-valve and the air admission valve.

19. In a device of the class described, having one or more ovens, means for individually delivering steam under pressure to each of said ovens and for controlling the pressure individual to each oven; a burner located below the ovens for heating the same; a housing enclosing the burner and ovens, in such manner as to leave a flame and hot-air space heated by the burner surrounding each oven; an air-valve or damper in the wall of each of the ovens for admitting hot dry-air from the flame-space directly into such oven; means connecting the air-valve or damper of each individual oven with the individual steam pressure-control of that particular oven in such manner that the same will be simultaneously moved; and a single handle for each of such valve and pressure controlling mechanisms located exterior to the housing for actuating the same.

20. In a stove, the combination with an oven having sloping sides of a shell or housing having parallel upright sides contiguous to the sloping sides and separated therefrom to provide an intervening heating space; a heating-means below the oven; a damper for admitting hot-air directly to the oven located in the oven wall; means for supplying steam to the oven; and means for jointly controlling the steam-supply and the admission of the air.

21. In a stove, the combination with an oven, of a boiler; means for conveying steam from the boiler to the oven; a damper for admitting hot-air directly to the oven; said damper having a crank-arm; a valve for controlling the steam supply, said valve having a crank-arm; a link connecting the two crank-arms; and means external of the stove for jointly actuating both crank-arms.

22. In a stove, the combination with an oven, of a steam-boiler below the oven; a pipe leading from the boiler to the oven; a throttling-valve located in the pipe-line; means for simultaneously and jointly heating the boiler and the oven; steam delivering means located within the oven in communication with the pipe comprising oppositely disposed nozzles for delivering the steam in jets which strike each other; exhaust means for the oven comprising a pipe leading from the oven to the heating means to therein dispose of the oven vapors and gases; a hot-air inlet to the oven; means for opening and closing such inlet; and mechanism connecting such hot-air inlet opening and closing means, and the steam-pipe throttling-valve, in such manner that as one is thrown toward open the other will be thrown toward closed, and vice-versa.

23. In a stove, the combination with an oven, of a heat retaining insulating main-shell or housing affording a flame-space within which the oven is supported; a gas-burner located below the oven, comprising a longitudinal main mixing-chamber; a plurality of branch burner-pipes in communication with the mixing-chamber extending on either side outward therefrom provided with flame perforations; a steam-boiler supported between the burner and oven, comprising a central longitudinal boiler-shell, and a plurality (one for each branch burner-pipe) of combined water circulating and heating-pipes, in communication at one end with the boiler-shell below, and at the other end above, the water-level thereof, and so bent that the flame from its immediately adjacent branch-burner-pipe will pass between the lower outlet and upper inlet bends thereof with but slight impingement against the abutting sides of same; a steam-pipe forming a communication between the steam-space of the boiler and the oven; a nebulizing nozzle located within the oven in communication with the steam-pipe; an exhaust-port in the oven-wall; and means for throttling such exhaust-port so as to vary the steam-pressure within the oven.

In testimony whereof I hereunto affix my signature.

CHARLES L. PICHEL.